US009613195B2

(12) United States Patent
Brandt et al.

(10) Patent No.: US 9,613,195 B2
(45) Date of Patent: Apr. 4, 2017

(54) SECONDARY SECURITY AUTHORITY

(71) Applicant: Rockwell Automation Technologies, Inc., Mayfield Heights, OH (US)

(72) Inventors: Robert A. Brandt, Menomonee Falls, WI (US); Clark L. Case, Aurora, OH (US); John C. Wilkinson, Hudson, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 15/160,976

(22) Filed: May 20, 2016

(65) Prior Publication Data

US 2016/0350521 A1    Dec. 1, 2016

Related U.S. Application Data

(60) Provisional application No. 62/168,266, filed on May 29, 2015.

(51) Int. Cl.
*G06F 21/31* (2013.01)
*G05B 19/4155* (2006.01)

(52) U.S. Cl.
CPC ......... *G06F 21/31* (2013.01); *G05B 19/4155* (2013.01); *G05B 2219/31229* (2013.01)

(58) Field of Classification Search
None
See application file for complete search history.

(56) References Cited

U.S. PATENT DOCUMENTS

| 5,564,049 | A | * | 10/1996 | Schmidt | G06F 8/36 |
| 7,536,548 | B1 | * | 5/2009 | Batke | H04L 63/061 |
| | | | | | 713/166 |
| 8,949,970 | B2 | * | 2/2015 | Bush | G06F 21/31 |
| | | | | | 726/17 |
| 9,323,245 | B2 | * | 4/2016 | Bush | G05B 23/0216 |

(Continued)

FOREIGN PATENT DOCUMENTS

| EP | 1640836 A1 | 3/2006 |
| WO | 2015071770 A2 | 5/2015 |

OTHER PUBLICATIONS

European search report issued in EP Application No. 16171895.2-1951 mailed on Oct. 25, 2016, 11 pages.

*Primary Examiner* — Christopher Revak

(57) ABSTRACT

Techniques to facilitate protecting control programs used in an industrial automation environment are disclosed herein. In at least one implementation, control system content provided by a primary entity is received along with a primary security authority provided by the primary entity, wherein the primary security authority defines primary usage rights for the control system content granted to a secondary entity. A secondary security authority provided by the secondary entity is received, wherein the secondary security authority defines secondary usage rights for the control system content that further restrict the primary usage rights. A request is received from a user associated with the secondary entity to perform an action associated with the control system content, and the request is processed with the secondary security authority to determine if the user is authorized to perform the action associated with the control system content based on the secondary usage rights.

10 Claims, 4 Drawing Sheets

(56) References Cited

U.S. PATENT DOCUMENTS

| | | | |
|---|---|---|---|
| 2003/0115292 A1 | 6/2003 | Griffin et al. | |
| 2005/0240658 A1* | 10/2005 | Schulke | H04L 67/32 709/217 |
| 2008/0141346 A1* | 6/2008 | Kay | H04L 12/58 726/4 |
| 2011/0161538 A1* | 6/2011 | Decker | G06F 11/2005 710/110 |
| 2013/0318206 A1* | 11/2013 | Hsiao | H04N 21/43615 709/219 |
| 2014/0371880 A1* | 12/2014 | Lee | G05B 15/02 700/20 |
| 2015/0222773 A1* | 8/2015 | Sugiyama | H04N 1/00856 358/1.14 |
| 2016/0109875 A1* | 4/2016 | Majewski | G06F 21/6218 700/98 |

* cited by examiner

SECONDARY SECURITY AUTHORITY

RELATED APPLICATIONS

This application claims the benefit of, and priority to, U.S. Provisional Patent Application No. 62/168,266, entitled "SECONDARY SECURITY AUTHORITY", filed May 29, 2015, which is hereby incorporated by reference in its entirety for all purposes.

TECHNICAL FIELD

Aspects of the disclosure are related to computing hardware and software technology, and in particular to industrial automation applications.

TECHNICAL BACKGROUND

Industrial automation environments utilize machines during the industrial manufacturing process, such as drives, pumps, motors, and robots. These machines typically have various moving parts and other components that are driven by instructions received from industrial controller systems. Machine builders and Solution Providers typically produce the control logic needed to run on these controllers to control the machines. The machine builders and Solution Providers often attempt to restrict access to and usage of the controller logic they produce, both internally and by end users.

In addition to controller logic, other content may be employed or generated during industrial automation operations, such as data sets, drive parameters, cam tables, product formulations, recipes, production data, and human-machine interface (HMI) components. An HMI receives and processes status data from the machines to generate various graphical displays. For example, an HMI graphical display might indicate status metrics of a drive, the pressure of a pump, the speed of a motor, or the output of a robot. The HMI may also provide a mechanism for an operator to send control instructions to an industrial controller system that controls a machine. For example, an operator might use the HMI to direct the control system to update drive parameters, turn on a pump, speed-up a motor, or stop a robot.

Overview

Provided herein are systems, methods, and software to facilitate protecting control programs used in an industrial automation environment. In at least one implementation, control system content provided by a primary entity is received, wherein the control system content comprises controller program code that directs an industrial controller to drive a machine system. A primary security authority provided by the primary entity is also received, wherein the primary security authority defines primary usage rights for the control system content granted to a secondary entity. A secondary security authority provided by the secondary entity is received, wherein the secondary security authority defines secondary usage rights for the control system content that further restrict the primary usage rights granted to the secondary entity by the primary entity in the primary security authority. A request is received from a user associated with the secondary entity to perform an action associated with the control system content. The request is processed with the primary security authority to determine if the secondary entity is authorized to perform the action associated with the control system content based on the primary usage rights. If the secondary entity is not authorized by the primary security authority to perform the action associated with the control system content based on the primary usage rights, then the request to perform the action is denied. However, if the secondary entity is authorized by the primary security authority to perform the action associated with the control system content based on the primary usage rights, then the request is processed with the secondary security authority to determine if the user is authorized to perform the action associated with the control system content based on the secondary usage rights. If the user is authorized by the secondary security authority to perform the action associated with the control system content based on the secondary usage rights, then the request to perform the action is granted. However, if the user is not authorized by the secondary security authority to perform the action associated with the control system content based on the secondary usage rights, then the request to perform the action is denied.

This Overview is provided to introduce a selection of concepts in a simplified form that are further described below in the Detailed Description. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
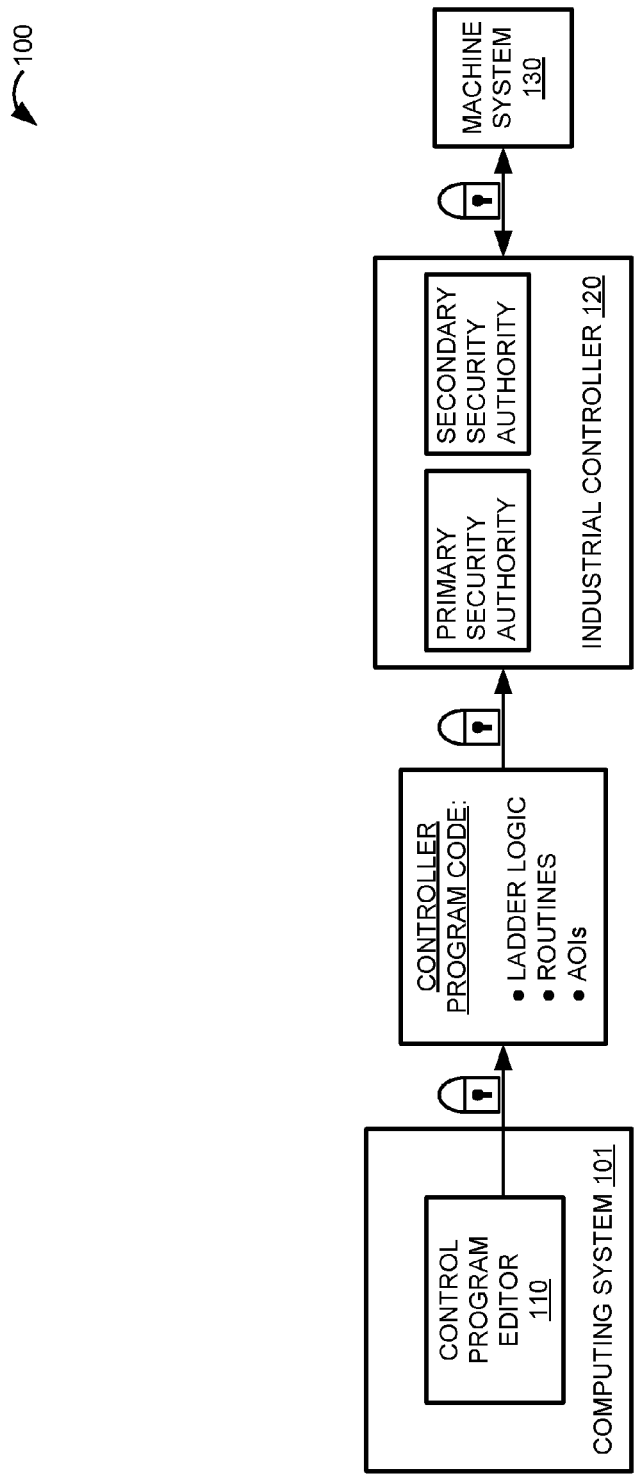
FIG. 1 is a block diagram that illustrates an industrial automation environment and an operational scenario that describes protection of logic source code in an exemplary implementation.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Implementations disclosed herein provide for digital rights management of intellectual property related to industrial automation. For example, integrated architecture control systems can be utilized by solution providers or system integrators to produce machine logic, configuration data, routines, and add-on instructions (AOIs) used to program logic controllers that control the operation of machines, and such control logic content should be protected from viewing or editing by unauthorized parties.

Disclosed herein is a role-based access control system for controlling access to and usage of controller project files and other control programs. With this system, machine builders can control their employee's access to project files, designate a set of privileges for their customers, and allow their customers to further control access to these privileges.

To achieve this protection, machine builders, original equipment manufacturers (OEMs), and solution providers may employ a primary security authority. In the primary security authority, machine builders may define permissions they wish to grant to internal personnel and also to external users. In some implementations, the permissions granted to external users are cached within a project file, while the permissions defined for internal users are stored within the primary security authority. Any users interacting with the project file who are not authenticated by the machine builder's security authority will be afforded only those permissions assigned to external users. An end user's security administrator can choose to further control access to the permissions granted to external users by specifying a secondary security authority in the project file. Typically, the secondary security authority works to further restrict a given user's permissions. For example, if a given action is denied to external users in the primary security authority, it cannot be granted by the secondary security authority. However, in some implementations, the secondary security authority could prevent primary users from performing certain actions as well that would otherwise be permitted by the primary security authority. For example, if a secondary entity receives a project file from a primary entity such as an OEM, and the secondary entity then adds some new proprietary content to the file, such as a new routine, device settings, configuration data, data sets, values, controller program code, or any other control system content, then the secondary entity could configure the secondary security authority to prevent users associated with the primary entity from viewing or editing that new content that belongs to the secondary entity.

Figure 2:
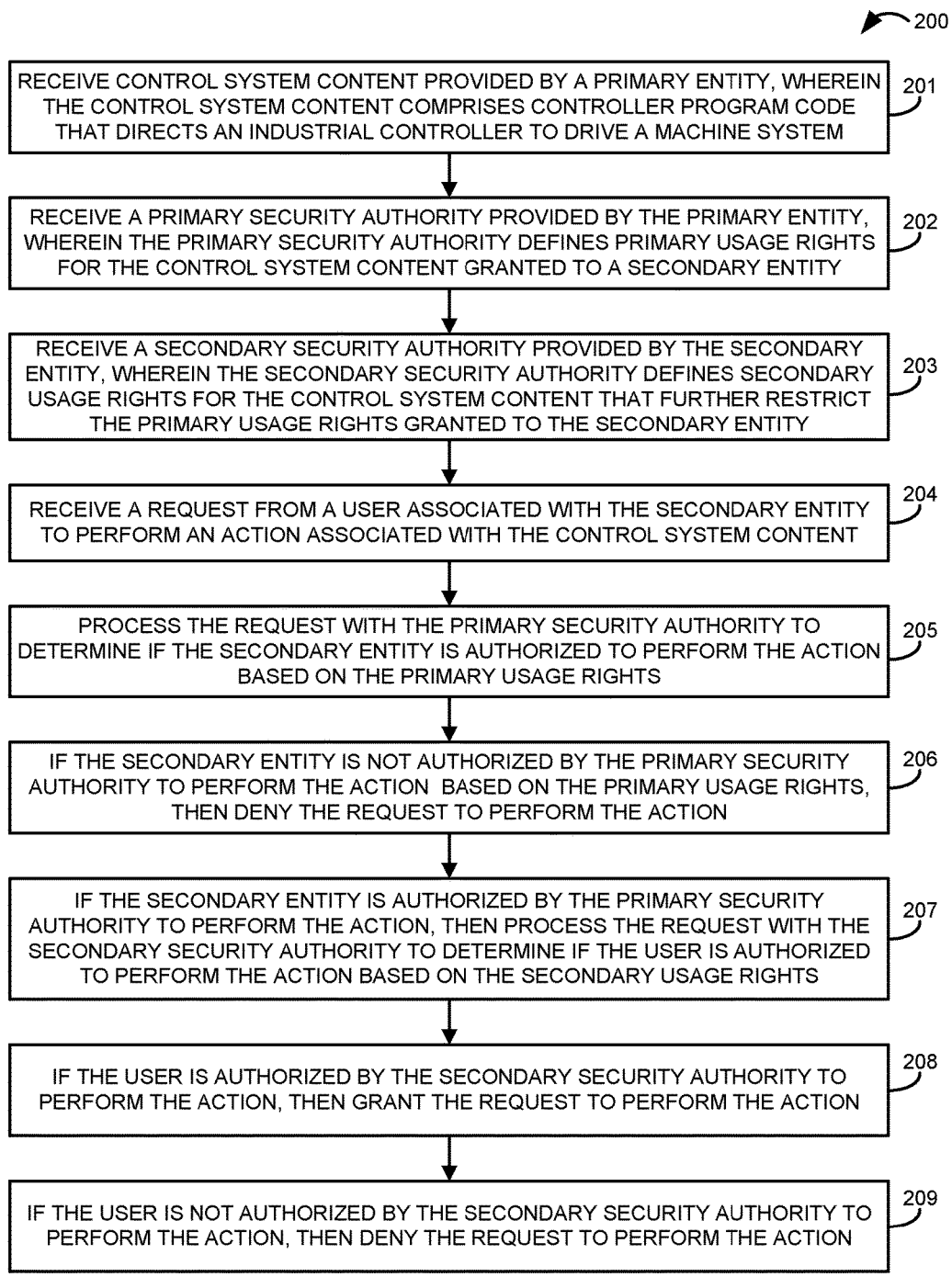
FIG. 2 is a flow diagram that illustrates an operation of a computing system in an exemplary implementation.
Figure 3:
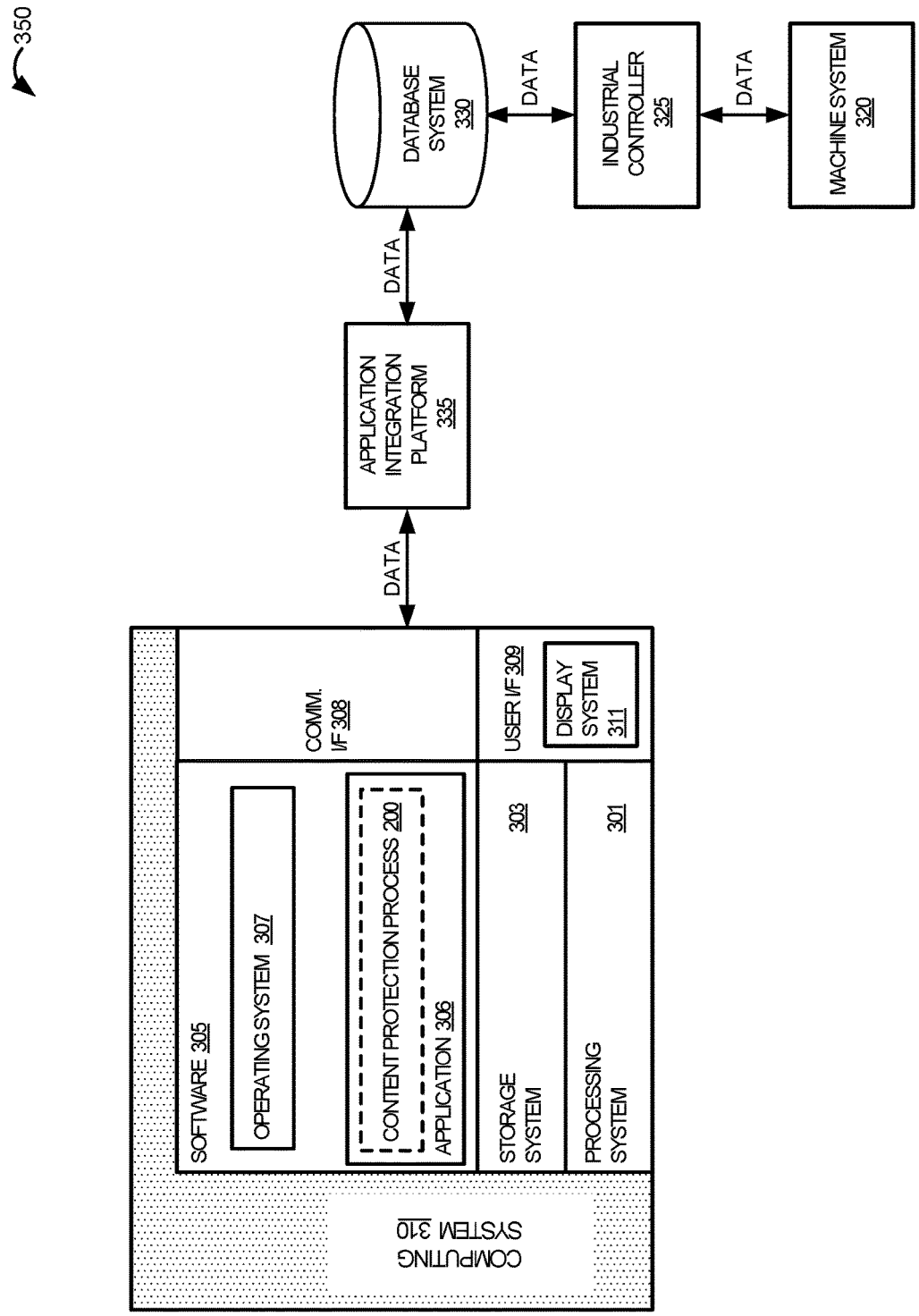
FIG. 3 is a block diagram that illustrates an operational scenario involving a computing system in an industrial automation environment in an exemplary implementation.
Figure 4:
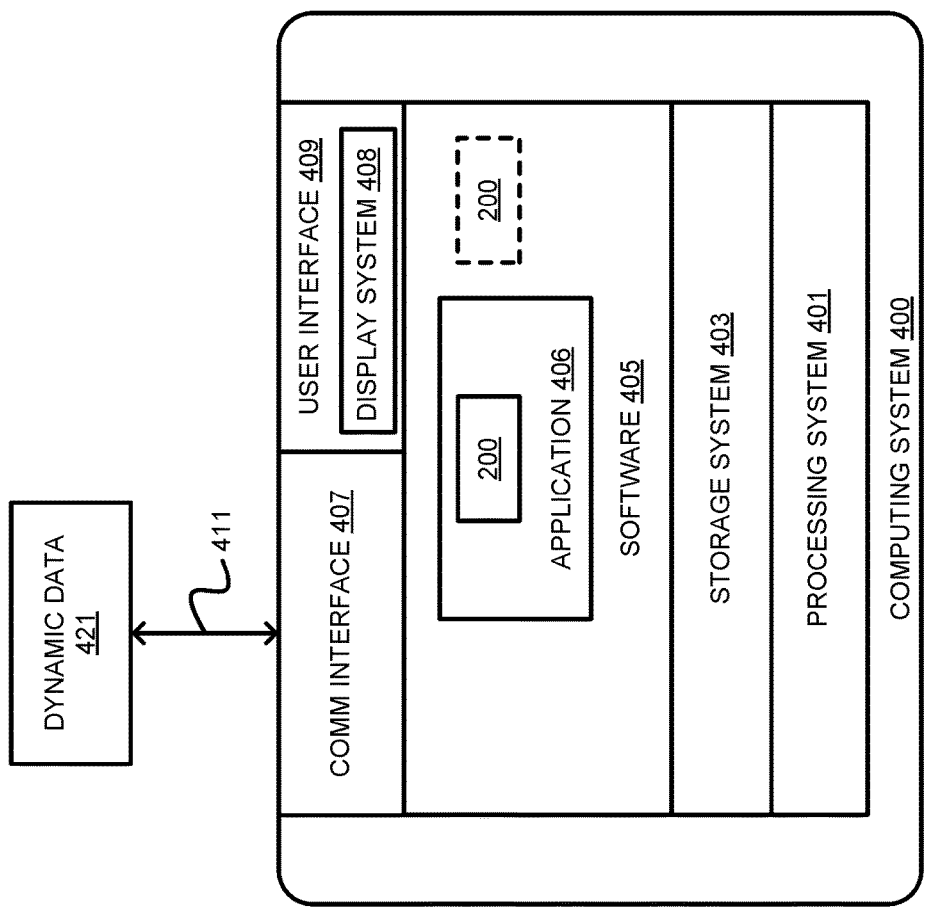
FIG. 4 is a block diagram that illustrates a computing system in an exemplary implementation.

Referring now to the drawings, FIG. 1 illustrates an exemplary industrial automation environment that describes protection of controller logic source code, and FIG. 2 illustrates an operation of a computing system in an exemplary implementation. FIG. 3 illustrates an exemplary industrial automation environment that includes a computing system that may be used to execute a control program protection process, and FIG. 4 illustrates an exemplary computing system that may be used to perform any of the processes and operational scenarios described herein.

Turning now to FIG. 1, a block diagram that illustrates industrial automation environment 100 in an exemplary implementation is shown. Industrial automation environment 100 includes computing system 101, industrial controller 120, and machine system 130. Industrial controller 120 and machine system 130 are in communication over a communication link. Computing system 101 is shown running control program editor 110. In some examples, control program editor 110 could comprise an RSLogix™ system or a Studio 5000® environment provided by Rockwell Automation, Inc. Note that there would typically be many more machine systems in most industrial automation environments, but the number of machine systems shown in FIG. 1 has been restricted for clarity.

Industrial automation environment 100 comprises an automobile manufacturing factory, food processing plant, oil drilling operation, microprocessor fabrication facility, or some other type of industrial enterprise. Machine system 130 could comprise a sensor, drive, pump, filter, drill, motor, robot, fabrication machinery, mill, printer, or any other industrial automation equipment, including their associated control systems. A control system comprises, for example, industrial controller 120, which could include automation controllers, programmable logic controllers (PLCs), or any other controllers used in automation control. In some examples, industrial controller 120 could comprise a ControlLogix® control system provided by Rockwell Automation, Inc. Additionally, machine system 130 could comprise other industrial equipment, such as a brew kettle in a brewery, a reserve of coal or other resources, or any other element that may reside in an industrial automation environment 100.

The controller program code produced by control program editor 110 provides control instructions that may be processed by industrial controller 120 to control the operation of machine system 130. Controller program code includes ladder logic, routines, and add-on instructions (AOIs), among other source data. AOIs provide the ability to design more modular code by creating simpler instructions that can be used to build more complex functionality by nesting instructions.

Original Equipment Manufacturers (OEMs), solution providers, machine builders, system integrators, and other designers typically generate controller program code using control program editor 110. OEMs typically design and/or build machine systems, along with their associated control instructions. Solution providers or system integrators often develop products but do not necessarily build or sell machines or equipment. Instead, solution providers typically design controller logic code to program systems to solve industrial problems. For example, a solution provider could use control program editor 110 to produce ladder logic that instructs industrial controller 120 to drive machine system 130 to create maple syrup from sap in a new and more efficient way than the commonly-practiced industry standard technique. OEMs, solution providers, and other designers and creators of control system content have an interest in protecting their controller program code, device settings, configuration data, values, and other proprietary content from being viewed, edited, and executed by unauthorized third parties, including the end users who purchase the code, both to protect their proprietary data and to prevent the end customer from making changes that may damage the system.

As indicated by the lock icons appearing in FIG. 1, protection can be applied to control program content to secure controller logic source code from unauthorized viewing, editing, execution, and other usage. Content owners can control which users are authorized to view, edit, copy, and export objects. For example, control system content protection may provide both design-time control of access to view or edit the control system content and run-time control over the execution of the control system content. In some examples, this protection may be applied to the control system content by control program editor 110 or any other software, device, or system, including HMI systems, industrial controller 120, and other industrial automation equipment.

In particular, a primary entity, such as a machine builder, OEM, solution provider, or some other source content owner can provide a primary security authority that defines various permissions and usage rights for a plurality of user groups. For example, an OEM might provide a primary security authority that defines a more permissive set of rights for OEM personnel, and a more restrictive set of usage rights for third party end users, such as an organization that purchases a control program from the OEM. A security administrator of the organization that purchased the control content from the OEM could then define a secondary security authority to further control access to the permissions granted to the organization by the OEM in the primary security authority. Typically, the secondary security authority works to further restrict user permissions. For example, if a given action is denied to a user type in the primary security authority, it cannot be granted by the secondary security authority. Some examples of user types that could have permissions defined by the primary security authority and the secondary security authority include engineers, operators, technicians, maintenance, external users, and any other user groups. The primary security authority and/or the secondary security authority could also define access permissions on a per-user basis in some examples.

By utilizing two layers of security authorities, the OEM is empowered to act as the primary owner of the machine and its controller logic content by defining what actions OEM personnel are allowed to perform with the logic software while restricting certain actions by the end customer in the primary security authority. In addition, the secondary security authority allows the end customer to further restrict what actions their personnel can take with respect to the machine and its controller program code.

In at least one implementation, a controller, which implements the logic software, comprises code that checks the identity of a user that is logged in and who is attempting to interact with the logic software. The code determines if the user is authorized by the primary or secondary security authority to determine what actions the user can take with respect to the logic software. If the user is authorized by the primary security authority, then the user is permitted to perform all of the actions that the OEM authorized for the user's group in the primary security authority. If the user is authorized by the secondary security authority, then the user is only permitted to perform the actions that the end customer authorized for the user's group in the secondary security authority. If the user is not authorized by either the primary security authority or the secondary security authority, then the user is denied permission to perform a requested action. In this manner, the code in the controller is able to determine under what authority (primary or secondary or none) a user is authorized to perform a specified action and grants or denies that person the ability to interact with the logic software in the controller per the rights associated with that security authority. An exemplary operation of computing system 101 to facilitate protection of control system content by utilizing primary and secondary security authorities will now be discussed with respect to FIG. 2.

FIG. 2 is a flow diagram that illustrates an operation 200 of computing system 101 in an exemplary implementation. The operation 200 shown in FIG. 2 may also be referred to as content protection process 200 herein. The steps of the operation are indicated below parenthetically. The following discussion of operation 200 will proceed with reference to computing system 101 of FIG. 1 in order to illustrate its operations, but note that the details provided in FIG. 1 are merely exemplary and not intended to limit the scope of process 200 to the specific implementation shown in FIG. 1.

Operation 200 may be employed to operate a computing system to facilitate protecting control programs used in an industrial automation environment. In some examples, operation 200 may be performed by computing system 101, although operation 200 could be executed by any computing system, including systems which do not have control program editor 110 installed thereon, including industrial controller 120 and/or machine system 130. As shown in the operational flow of process 200, computing system 101 receives control system content provided by a primary entity, wherein the control system content comprises controller program code that directs industrial controller 120 to drive machine system 130 (201). The control system content typically comprises user-defined data for configuring and/or operating an industrial automation device. For example, the control system content could comprise any data associated with the operation of a configurable industrial automation device, such as industrial controller 120 and/or machine system 130, HMI systems, drives, or any other industrial automation device that may be configured by a user. In some examples, the control system content could comprise controller program code, controller project files, device settings, machine features, configuration data, HMI content, production data, formulation data, drive configuration data, cam tables, product formulations and recipes, data sets, values, and any other content associated with the operation of an industrial automation device.

The control system content could be received by computing system 101 in any manner. Typically, the control system content is provided by a primary entity that owns, designs, creates, authors, or otherwise originates control system content, including proprietary controller program code. Some examples of a primary entity that could provide the control system content include OEMs, Solution Providers, machine builders, system integrators, and any other content originators. In some examples, control system content could be received by computing system 101 from a user operating control program editor 110 to generate the control system content. Additionally, the control system content could be received by computing system 101 from a user or another system entering, copying, installing, inputting, or otherwise providing the control system content to computing system 101. The control system content could also be received by computing system 101 over a network from a remote system in some examples. In this example, the control system content comprises controller program code that directs industrial controller 120 to drive machine system 130.

Computing system 101 receives a primary security authority provided by the primary entity, wherein the primary security authority defines primary usage rights for the control system content granted to a secondary entity (202). The primary entity typically defines the primary usage rights for the control system content by specifying permissions in the primary security authority for the secondary entity. The secondary entity typically comprises any users that are external to the primary entity. For example, if the primary entity is an OEM product developer, the secondary entity would include any user who is not associated with the OEM or who is outside of the OEM's organization, such as a customer or end user of the OEM's product. Typically, the primary security authority is associated with the control system content, and in some examples, the primary security authority could be embedded within or applied to the control system content and thus received by computing system 101 along with the control system content. The primary usage rights could comprise permissions granted to the secondary entity to perform any actions with respect to the control system content, such as viewing, editing, executing, clearing faults, modifying properties, importing/exporting, uploading/downloading, or any other actions that may be performed with the control system content. In some examples, the primary security authority could define a plurality of different user groups, with different levels of permissions or usage rights applied to each of the groups. For example, the primary security authority could define one or more user groups or roles for internal users that are associated with the primary entity, such as OEM engineers and OEM technicians, and additionally define the primary usage rights for one or more user groups associated with the secondary entity, such as an external users group. Thus, the primary security authority could grant permissions for the control system content to one or more user groups associated with the primary entity, and also define the primary usage rights for the control system content granted to the secondary entity.

Computing system 101 receives a secondary security authority provided by the secondary entity, wherein the secondary security authority defines secondary usage rights for the control system content that further restrict the primary usage rights granted to the secondary entity by the primary entity in the primary security authority (203). Typically, a security administrator or some other personnel associated with the secondary entity could define the secondary usage rights in the secondary security authority. The secondary usage rights may define permissions for various user groups associated with the secondary entity. For example, the secondary security authority could define a plurality of different user groups, with different levels of permissions or usage rights applied to each of the groups. In other words, the secondary usage rights could define control system content permissions for one or more user groups associated with the secondary entity. The secondary usage rights defined in the secondary security authority typically serve to further limit the primary usage rights granted to the secondary entity by the primary entity in the primary security authority. In other words, if a particular action was not permitted in the primary security authority provided by the primary entity, then the secondary security authority cannot grant permission to perform that action. Therefore, the secondary usage rights could comprise permissions to perform any actions authorized in the primary security authority with respect to the control system content, such as viewing, editing, executing, clearing faults, modifying properties, importing/exporting, uploading/downloading, or any other actions associated with the control system content for which permission is first granted in the primary security authority. In some implementations, the secondary entity could configure the secondary authority to deny privileges explicitly granted to any user or group in the primary security authority. For example, if the primary security authority grants permissions for the control system content to one or more user groups associated with the primary entity, then secondary entity could configure the secondary security authority to restrict one or more of the permissions for the control system content granted to the one or more user groups associated with the primary entity in the primary security authority. In other words, the secondary entity is able to restrict rights for the primary entity to access new content added by the secondary entity. As an example, if an end user adds a new routine to a project file that the OEM provided, the end user able to specify a policy that disallows the OEM from viewing, modifying, or otherwise accessing the new routine.

Computing system 101 receives a request from a user associated with the secondary entity to perform an action associated with the control system content (204). The request could comprise any attempt by a user to perform an action associated with the control system content, such as viewing, editing, copying, executing, or any other command. Any user associated with the secondary entity could make the request to perform the action, including administrators, engineers, technicians, or any other user of the control system content.

Computing system 101 processes the request with the primary security authority to determine if the secondary entity is authorized to perform the requested action associated with the control system content based on the primary usage rights (205). In some examples, computing system 101 may process the request with the primary security authority to determine if the secondary entity is authorized to perform the action by determining if the user associated with the secondary entity or a group the user belongs to has been granted primary usage rights in the primary security authority. For example, processing the request with the primary security authority to determine if the secondary entity is authorized to perform the action associated with the control system content based on the primary usage rights could comprise processing the request with the primary security authority to determine if an external users group associated with the secondary entity is authorized by the primary security authority to perform the action associated with the control system content. Typically, computing system 101 first attempts to determine if the user associated with the secondary entity is authorized to perform the requested action based on the primary security authority before consulting the secondary security authority, but computing system 101 could be configured to first check user permissions in the secondary security authority in some examples, or could check the secondary security authority concurrently with the primary security authority.

If the secondary entity is not authorized by the primary security authority to perform the action associated with the control system content based on the primary usage rights, then computing system 101 denies the request to perform the action (206). In other words, when the user associated with the secondary entity is not authorized by the primary security authority to perform the action associated with the control system content, then computing system 101 does not perform the requested action and effectively ignores the user's request. In some examples, computing system 101 may notify the user that the request is denied because the user does not have permission to perform the requested action.

If the secondary entity is authorized by the primary security authority to perform the action associated with the control system content based on the primary usage rights, then computing system 101 processes the request with the secondary security authority to determine if the user is authorized to perform the action associated with the control system content based on the secondary usage rights (207). For example, computing system 101 may process the request with the secondary security authority to determine if the user is authorized to perform the action by determining if the user or a group the user belongs to has been granted secondary usage rights in the secondary security authority. As discussed above, the secondary security authority defines secondary usage rights for the control system content that further restrict the primary usage rights granted to the secondary entity by the primary entity in the primary security authority, so even if the secondary entity is generally permitted to perform the requested action according to the primary usage rights granted to the secondary entity in the primary security authority, the user may still be prohibited from performing the action based on the secondary security authority.

If the user is authorized by the secondary security authority to perform the action associated with the control system content based on the secondary usage rights, then computing system 101 grants the request to perform the action (208). Typically, when the user is authorized by the secondary security authority to perform the action, computing system 101 may grant the request to perform the action by processing the request and executing the requested action itself. However, computing system 101 could also direct another application, another computing system, industrial controller 120, or some other system to perform the requested action in some examples. For example, if the requested action is to clear a fault on industrial controller 120, computing system 101 could grant the request by directing controller 120 to clear the fault.

If the user is not authorized by the secondary security authority to perform the action associated with the control system content based on the secondary usage rights, then computing system 101 denies the request to perform the action (209). In this case, even when the secondary entity is generally permitted to perform the requested action according to the primary usage rights granted to the secondary entity in the primary security authority, when the user associated with the secondary entity is not authorized by the secondary security authority to perform the action associated with the control system content, then computing system 101 does not perform the requested action and effectively ignores the user's request. In some examples, computing system 101 may notify the user that the request is denied because the user does not have permission to perform the requested action. Note that enforcement of the security authorities described herein could occur at one or more places throughout the entire system, including industrial controller 120 and machine system 130, and some or all of the operational steps of content protection process 200 could be executed by industrial controller 120 or any other system or device associated with industrial automation environment 100. Thus, in at least one implementation, the primary security authority and the secondary security authority are enforced at industrial controller 120.

Advantageously, the above techniques enable a primary entity to protect proprietary control system content by applying a primary security authority to the control system content that defines primary usage rights for a secondary entity of the control system content. In addition, the secondary entity can then establish a secondary security authority to define secondary usage rights that further restrict the primary usage rights for certain users or user groups associated with the secondary entity. By protecting the control system content in this manner, the techniques described herein provide the technical advantage of electronically safeguarding proprietary data from unlicensed access, execution, and any other use. Further, by eliminating unauthorized requests to access and use the control system content, the load on the processors, mechanical components, and other elements of an industrial automation environment may be reduced, resulting in significant energy savings by avoiding unnecessary operations. In this manner, owners of the control system content can better protect and manage their digital rights over the content they produce, and end users can impose further restrictions on the content as desired.

An illustrative example of one possible implementation of primary and secondary security authorities will now be discussed. The following example could be executed by computing system 101 and other elements of industrial automation environment 100, and could also be combined with operation 200 of FIG. 2 in some implementations.

In this example, an OEM utilizes a manufacturing software suite to create a project file comprising logic source code to drive an industrial controller that operates a machine. To secure the controller project file from unauthorized viewing, editing, execution, or other actions, the OEM creates a primary security authority that defines permissions for internal OEM personnel and external users. These two user groups are referred to herein as 'OEM_Engineers' and 'External_Users', respectively, where the 'OEM_Engineers' includes all OEM personnel and the 'External_Users' group includes everyone else, including any non-OEM personnel attempting to open the controller project file or upload the project file from the controller.

In this example, the controller project file is referred to as 'ControllerXYZ.ACD' which has several routines comprising logic programming code. The OEM designates a particular directory having an identifier 'FT123' as the primary directory for the 'ControllerXYZ.ACD' project file. A security administrator for the OEM then applies the OEM's security policies to the 'ControllerXYZ.ACD' file, which are then cached within the project file. The OEM security administrator configures the designated directory having identifier 'FT123' with security permissions as illustrated in the following table:

| Action | OEM_Engineers | External_Users |
| --- | --- | --- |
| Controller: Clear Fault | Allow | Allow |
| Controller: Modify Properties | Allow | Deny |
| Routine: View Logic | Allow | Allow |
| Routine: Modify Logic | Allow | Deny |
| Project: Download | Allow | Allow |
| Project: Upload | Allow | Deny |

As shown in the above table, the OEM security administrator has granted full permissions to the 'OEM_Engineers' user group, but has only allowed the 'External_Users' group to clear faults on the controller, view logic of routines, and download the project. The 'External_Users' group is expressly prohibited from modifying properties of the controller, modifying the logic of routines, and uploading the project. Once these policies are created, the OEM product developer transfers the 'External_Users' policies to the 'ControllerXYZ.ACD' project file so that the data from the table above, without the 'OEM_Engineers' column, is stored in the controller project file as a primary security authority. The OEM product developer then downloads the 'ControllerXYZ.ACD' file to a controller, along with the primary security authority.

The OEM then provides the controller having the 'ControllerXYZ.ACD' project file to a customer. An engineer of the customer can then work with the project file and the controller, but the actions that the engineer can take are limited by the OEM policies in the primary security authority. For example, the customer engineer can open the 'ControllerXYZ.ACD' project file and take the controller online, and can successfully attempt the 'Controller: Clear Fault' action but is denied permission when attempting the 'Controller: Modify Properties' action. Likewise, the customer engineer can successfully view the logic of a routine and download the project, but is denied permission to edit the logic of a routine or upload the project.

If the customer desires to establish their own security policies for the 'ControllerXYZ.ACD' project file, the customer can define a secondary security authority to further restrict the permissions granted to the customer by the OEM in the primary security authority. To define the secondary security authority, a security administrator for the customer configures an existing customer directory having identifier 'FT456' with user groups 'Customer_Engineers' and 'Customer_Maintenance'.

The customer security administrator configures the customer directory having identifier 'FT456' with security permissions as illustrated in the following table:

| Action | Customer_Engineers | Customer_Maintenance |
|---|---|---|
| Controller: Clear Fault | Allow | Allow |
| Controller: Modify Properties | Deny* | Deny* |
| Routine: View Logic | Allow | Deny |
| Routine: Modify Logic | Deny* | Deny* |
| Project: Download | Allow | Deny |
| Project: Upload | Deny* | Deny* |

As shown in the table above, the customer security administrator has allowed the 'Customer_Engineers' user group to clear faults on the controller, view logic of routines, and download the project, but has only allowed users in the 'Customer_Maintenance' user group to clear controller faults. Note that the permissions for the 'Controller: Modify Properties', 'Routine: Modify Logic', and 'Project: Upload' actions are marked with an asterisk (*) because what the customer security administrator sets these policies to is moot, since they are denied to the 'External_Users' group of the primary directory, and the secondary security authority cannot grant permissions denied by the primary directory.

The customer security administrator configures the 'ControllerXYZ.ACD' project file to use the customer directory having identifier 'FT456' as its secondary directory. Typically, this configuration is either done online or a download is subsequently performed. Once these permissions are set in the secondary security authority, if a customer engineer who is a member of the 'Customer_Engineers' user group in the customer directory with identifier 'FT456' opens the 'ControllerXYZ.ACD' project file, then the permissions for the 'Customer_Engineers' in the table above are followed. However, if a customer maintenance worker who is a member of the 'Customer_Maintenance' user group in the customer directory with identifier 'FT456' opens the 'ControllerXYZ.ACD' file, the permissions for the 'Customer_Maintenance' group in the above table are followed. Thus, the maintenance worker will only be permitted to perform the 'Controller: Clear Fault' action. If an unauthorized user who does not have an account in the customer directory having identifier 'FT456' attempts to open the 'ControllerXYZ.ACD' project file, this action will be blocked, along with any other actions attempted by this unauthorized user. Finally, if an OEM field engineer who is part of the 'OEM_Engineers' user group visits the customer and is given a copy of the 'ControllerXYZ.ACD' project file as modified by the customer with the secondary security authority, the OEM engineer may be granted permission to access this file and perform other actions authorized for the 'OEM_Engineers' group based on the copy of OEM directory having identifier 'FT123' cached on the engineer's laptop. In this manner, the OEM can control the actions that OEM employees can take with respect to a particular controller project file, designate a set of privileges for a customer, and allow the customer to further control access to these privileges.

Turning now to FIG. 3, a block diagram that illustrates an industrial automation environment 350 in an exemplary implementation is shown. Industrial automation environment 350 provides an example of an industrial automation environment that may be utilized to implement the control program protection processes disclosed herein, but other environments could also be used. Industrial automation environment 350 includes computing system 310, machine system 320, industrial controller 325, database system 330, and application integration platform 335. Machine system 320 and controller 325 are in communication over a communication link, controller 325 and database system 330 communicate over a communication link, database system 330 and application integration platform 335 communicate over a communication link, and application integration platform 335 and computing system 310 are in communication over a communication link. Note that there would typically be many more machine systems in most industrial automation environments, but the number of machine systems shown in FIG. 3 has been restricted for clarity.

Industrial automation environment 350 comprises an automobile manufacturing factory, food processing plant, oil drilling operation, microprocessor fabrication facility, or some other type of industrial enterprise. Machine system 320 could comprise a sensor, drive, pump, filter, drill, motor, robot, fabrication machinery, mill, printer, or any other industrial automation equipment, including their associated control systems. A control system comprises, for example, industrial controller 325, which could include automation controllers, programmable logic controllers (PLCs), programmable automation controllers (PACs), or any other controllers used in automation control. Additionally, machine system 320 could comprise other industrial equipment, such as a brew kettle in a brewery, a reserve of coal or other resources, or any other element that may reside in an industrial automation environment 350.

Machine system 320 continually produces operational data over time. The operational data indicates the current status of machine system 320, such as parameters, pressure, temperature, speed, energy usage, operational equipment effectiveness (OEE), mean time between failure (MTBF), mean time to repair (MTTR), voltage, throughput volumes, times, tank levels, or any other performance status metrics. The operational data may comprise dynamic charts or trends, real-time video, or some other graphical content. Machine system 320 and/or controller 325 is capable of transferring the operational data over a communication link to database system 330, application integration platform 335, and computing system 310, typically via a communication network. Database system 330 could comprise a disk, tape, integrated circuit, server, or some other memory device. Database system 330 may reside in a single device or may be distributed among multiple memory devices.

Application integration platform 335 comprises a processing system and a communication transceiver. Application integration platform 335 may also include other components such as a router, server, data storage system, and power supply. Application integration platform 335 may reside in a single device or may be distributed across multiple devices. Application integration platform 335 may be a discrete system or may be integrated within other systems—including other systems within industrial automation environment 300. In some examples, application integration platform 335 could comprise a FactoryTalk® VantagePoint server system provided by Rockwell Automation, Inc.

The communication links over which data is exchanged between machine system 320, industrial controller 325, database system 330, application integration platform 335, and communication interface 308 of computing system 310 could use metal, air, space, optical fiber such as glass or plastic, or some other material as the transport medium— including combinations thereof. The communication links could comprise multiple network elements such as routers, gateways, telecommunication switches, servers, processing systems, or other communication equipment and systems for providing communication and data services. These communication links could use various communication protocols, such as time-division multiplexing (TDM), internet protocol (IP), Ethernet, telephony, optical networking, packet networks, wireless mesh networks (WMN), local area networks (LAN), metropolitan area networks (MAN), wide area networks (WAN), hybrid fiber coax (HFC), communication signaling, wireless protocols, communication signaling, peer-to-peer networking over Bluetooth, Bluetooth low energy, Wi-Fi Direct, near field communication (NFC), or some other communication format, including combinations thereof. The communication links could be direct links or may include intermediate networks, systems, or devices.

Computing system 310 may be representative of any computing apparatus, system, or systems on which the control program protection processes disclosed herein or variations thereof may be suitably implemented. Computing system 310 provides an example of a computing system that could be used as a either a server or a client device in some implementations, although such devices could have alternative configurations. Examples of computing system 310 include mobile computing devices, such as cell phones, tablet computers, laptop computers, notebook computers, and gaming devices, as well as any other type of mobile computing devices and any combination or variation thereof. Examples of computing system 310 also include desktop computers, server computers, and virtual machines, as well as any other type of computing system, variation, or combination thereof. In some implementations, computing system 310 could comprise a mobile device capable of operating in a server-like fashion which, among other uses, could be utilized in a wireless mesh network.

Computing system 310 includes processing system 301, storage system 303, software 305, communication interface 308, and user interface 309. Processing system 301 is operatively coupled with storage system 303, communication interface 308, and user interface 309. Processing system 301 loads and executes software 305 from storage system 303. Software 305 includes application 306 and operating system 307. Application 306 may include control program protection process 300 in some examples. When executed by computing system 310 in general, and processing system 301 in particular, software 305 directs computing system 310 to operate as described herein for content protection process 200 or variations thereof. In this example, user interface 309 includes display system 311, which itself may be part of a touch screen that also accepts user inputs via touches on its surface. Computing system 310 may optionally include additional devices, features, or functionality not discussed here for purposes of brevity.

Turning now to FIG. 4, a block diagram is shown that illustrates computing system 400 in an exemplary implementation. Computing system 400 provides an example of computing systems 101, 310, or any computing system that may be used to execute content protection process 200 or variations thereof, although such systems could use alternative configurations. Computing system 400 includes processing system 401, storage system 403, software 405, communication interface 407, and user interface 409. User interface 409 comprises display system 408. Software 405 includes application 406 which itself includes content protection process 200. Content protection process 200 may optionally be implemented separately from application 406.

Computing system 400 may be representative of any computing apparatus, system, or systems on which application 406 and content protection process 200 or variations thereof may be suitably implemented. Examples of computing system 400 include mobile computing devices, such as cell phones, tablet computers, laptop computers, notebook computers, and gaming devices, as well as any other type of mobile computing devices and any combination or variation thereof. Note that the features and functionality of computing system 400 may apply as well to desktop computers, server computers, and virtual machines, as well as any other type of computing system, variation, or combination thereof.

Computing system 400 includes processing system 401, storage system 403, software 405, communication interface 407, and user interface 409. Processing system 401 is operatively coupled with storage system 403, communication interface 407, and user interface 409. Processing system 401 loads and executes software 405 from storage system 403. When executed by computing system 400 in general, and processing system 401 in particular, software 405 directs computing system 400 to operate as described herein for content protection process 200 or variations thereof. Computing system 400 may optionally include additional devices, features, or functionality not discussed herein for purposes of brevity.

Referring still to FIG. 4, processing system 401 may comprise a microprocessor and other circuitry that retrieves and executes software 405 from storage system 403. Processing system 401 may be implemented within a single processing device but may also be distributed across multiple processing devices or sub-systems that cooperate in executing program instructions. Examples of processing system 401 include general purpose central processing units, application specific processors, and logic devices, as well as any other type of processing device, combinations, or variations thereof.

Storage system 403 may comprise any computer readable media or storage media readable by processing system 401 and capable of storing software 405. Storage system 403 may include volatile and nonvolatile, removable and non-removable media implemented in any method or technology for storage of information, such as computer readable instructions, data structures, program modules, or other data. Storage system 403 may be implemented as a single storage device but may also be implemented across multiple storage devices or sub-systems co-located or distributed relative to each other. Storage system 403 may comprise additional elements, such as a controller, capable of communicating with processing system 401. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the storage media a propagated signal.

In operation, in conjunction with user interface 409, processing system 401 loads and executes portions of software 405, such as content protection process 200, to render a graphical user interface for application 406 for display by display system 408 of user interface 409. Software 405 may be implemented in program instructions and among other functions may, when executed by computing system 400 in general or processing system 401 in particular, direct computing system 400 or processing system 401 to receive control system content provided by a primary entity, wherein the control system content comprises controller program code that directs an industrial controller to drive a machine system, and receive a primary security authority provided by the primary entity, wherein the primary security authority defines primary usage rights for the control system content granted to a secondary entity. Software 405 may further direct computing system 400 or processing system 401 to receive a secondary security authority defined by the secondary entity, wherein the secondary security authority defines secondary usage rights for the control system content that further restrict the primary usage rights granted to the secondary entity by the primary entity in the primary security authority. In addition, software 405 directs computing system 400 or processing system 401 to receive a request from a user associated with the secondary entity to perform an action associated with the control system content, and process the request with the primary security authority to determine if the secondary entity is authorized to perform the action associated with the control system content based on the primary usage rights. Software 405 directs computing system 400 or processing system 401 to, if the secondary entity is not authorized by the primary security authority to perform the action associated with the control system content based on the primary usage rights, then deny the request to perform the action. Software 405 further directs computing system 400 or processing system 401 to, if the secondary entity is authorized by the primary security authority to perform the action associated with the control system content based on the primary usage rights, then process the request with the secondary security authority to determine if the user is authorized to perform the action associated with the control system content based on the secondary usage rights. Software 405 directs computing system 400 or processing system 401 to, if the user is authorized by the secondary security authority to perform the action associated with the control system content based on the secondary usage rights, then grant the request to perform the action. Finally, software 405 may direct computing system 400 or processing system 401 to, if the user is not authorized by the secondary security authority to perform the action associated with the control system content based on the secondary usage rights, then deny the request to perform the action.

Software 405 may include additional processes, programs, or components, such as operating system software or other application software. Examples of operating systems include Windows®, iOS®, and Android®, as well as any other suitable operating system. Software 405 may also comprise firmware or some other form of machine-readable processing instructions executable by processing system 401.

In general, software 405 may, when loaded into processing system 401 and executed, transform computing system 400 overall from a general-purpose computing system into a special-purpose computing system customized to facilitate protecting control programs used in an industrial automation environment as described herein for each implementation. For example, encoding software 405 on storage system 403 may transform the physical structure of storage system 403. The specific transformation of the physical structure may depend on various factors in different implementations of this description. Examples of such factors may include, but are not limited to the technology used to implement the storage media of storage system 403 and whether the computer-storage media are characterized as primary or secondary storage.

In some examples, if the computer-storage media are implemented as semiconductor-based memory, software 405 may transform the physical state of the semiconductor memory when the program is encoded therein. For example, software 405 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 400 is generally intended to represent a computing system with which software 405 is deployed and executed in order to implement application 406 and/or content protection process 200 (and variations thereof). However, computing system 400 may also represent any computing system on which software 405 may be staged and from where software 405 may be distributed, transported, downloaded, or otherwise provided to yet another computing system for deployment and execution, or yet additional distribution. For example, computing system 400 could be configured to deploy software 405 over the internet to one or more client computing systems for execution thereon, such as in a cloud-based deployment scenario.

Communication interface 407 may include communication connections and devices that allow for communication between computing system 400 and other computing systems (not shown) or services, over a communication network 411 or collection of networks. In some implementations, communication interface 407 receives dynamic data 421 over communication network 411. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 409 may include a voice input device, a touch input device for receiving a gesture from a user, a motion input device for detecting non-touch gestures and other motions by a user, and other comparable input devices and associated processing elements capable of receiving user input from a user. Output devices such as display system 408, speakers, haptic devices, and other types of output devices may also be included in user interface 409. The aforementioned user input devices are well known in the art and need not be discussed at length here. User interface 409 may also include associated user interface software executable by processing system 401 in support of the various user input and output devices discussed above. Separately or in conjunction with each other and other hardware and software elements, the user interface software and devices may provide a graphical user interface, a natural user interface, or any other kind of user interface.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated drawings teach the best mode of the invention. The following claims specify the scope of the invention. Some aspects of the best mode may not fall within the scope of the invention as specified by the claims. Also, while the preceding discussion describes embodiments employed specifically in conjunction with the monitoring and analysis of industrial processes, other applications, such as the mathematical modeling or monitoring of any man-made or naturally-existing system, may benefit from use of the concepts discussed above. Further, those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a computing system to facilitate protecting control programs used in an industrial automation environment, the method comprising:
   receiving control system content provided by a primary entity, wherein the control system content comprises controller program code that directs an industrial controller to drive a machine system;
   receiving a primary security authority provided by the primary entity, wherein the primary security authority defines primary usage rights for the control system content granted to a secondary entity;
   receiving a secondary security authority provided by the secondary entity, wherein the secondary security authority defines secondary usage rights for the control system content that further restrict the primary usage rights granted to the secondary entity by the primary entity in the primary security authority;
   receiving a request from a user associated with the secondary entity to perform an action associated with the control system content;
   processing the request with the primary security authority to determine if the secondary entity is authorized to perform the action associated with the control system content based on the primary usage rights;
   if the secondary entity is not authorized by the primary security authority to perform the action associated with the control system content based on the primary usage rights, then denying the request to perform the action;
   if the secondary entity is authorized by the primary security authority to perform the action associated with the control system content based on the primary usage rights, then processing the request with the secondary security authority to determine if the user is authorized to perform the action associated with the control system content based on the secondary usage rights;
   if the user is authorized by the secondary security authority to perform the action associated with the control system content based on the secondary usage rights, then granting the request to perform the action; and
   if the user is not authorized by the secondary security authority to perform the action associated with the control system content based on the secondary usage rights, then denying the request to perform the action.

2. The method of claim 1 wherein the secondary usage rights define control system content permissions for one or more user groups associated with the secondary entity.

3. The method of claim 1 wherein the primary security authority grants permissions for the control system content to one or more user groups associated with the primary entity.

4. The method of claim 3 wherein the secondary security authority restricts one or more of the permissions for the control system content granted to the one or more user groups associated with the primary entity in the primary security authority.

5. One or more computer-readable storage media having program instructions stored thereon to facilitate protecting control programs used in an industrial automation environment, wherein the program instructions, when executed by a computing system, direct the computing system to at least:
   receive control system content provided by a primary entity, wherein the control system content comprises controller program code that directs an industrial controller to drive a machine system;
   receive a primary security authority provided by the primary entity, wherein the primary security authority defines primary usage rights for the control system content granted to a secondary entity;
   receive a secondary security authority provided by the secondary entity, wherein the secondary security authority defines secondary usage rights for the control system content that further restrict the primary usage rights granted to the secondary entity by the primary entity in the primary security authority;
   receive a request from a user associated with the secondary entity to perform an action associated with the control system content;
   process the request with the primary security authority to determine if the secondary entity is authorized to perform the action associated with the control system content based on the primary usage rights;
   if the secondary entity is not authorized by the primary security authority to perform the action associated with the control system content based on the primary usage rights, then deny the request to perform the action;
   if the secondary entity is authorized by the primary security authority to perform the action associated with the control system content based on the primary usage rights, then process the request with the secondary security authority to determine if the user is authorized to perform the action associated with the control system content based on the secondary usage rights;
   if the user is authorized by the secondary security authority to perform the action associated with the control system content based on the secondary usage rights, then grant the request to perform the action; and
   if the user is not authorized by the secondary security authority to perform the action associated with the control system content based on the secondary usage rights, then deny the request to perform the action.

6. The one or more computer-readable storage media of claim 5 wherein the secondary usage rights define control system content permissions for one or more user groups associated with the secondary entity.

7. The one or more computer-readable storage media of claim 5 wherein the primary security authority grants permissions for the control system content to one or more user groups associated with the primary entity.

8. An apparatus to facilitate protecting control programs used in an industrial automation environment, the apparatus comprising:

one or more computer-readable storage media; and program instructions stored on the one or more computer-readable storage media that, when executed by a processing system, direct the processing system to at least:

receive control system content provided by a primary entity, wherein the control system content comprises controller program code that directs an industrial controller to drive a machine system;

receive a primary security authority provided by the primary entity, wherein the primary security authority defines primary usage rights for the control system content granted to a secondary entity;

receive a secondary security authority provided by the secondary entity, wherein the secondary security authority defines secondary usage rights for the control system content that further restrict the primary usage rights granted to the secondary entity by the primary entity in the primary security authority;

receive a request from a user associated with the secondary entity to perform an action associated with the control system content;

process the request with the primary security authority to determine if the secondary entity is authorized to perform the action associated with the control system content based on the primary usage rights;

if the secondary entity is not authorized by the primary security authority to perform the action associated with the control system content based on the primary usage rights, then deny the request to perform the action;

if the secondary entity is authorized by the primary security authority to perform the action associated with the control system content based on the primary usage rights, then process the request with the secondary security authority to determine if the user is authorized to perform the action associated with the control system content based on the secondary usage rights;

if the user is authorized by the secondary security authority to perform the action associated with the control system content based on the secondary usage rights, then grant the request to perform the action; and if the user is not authorized by the secondary security authority to perform the action associated with the control system content based on the secondary usage rights, then deny the request to perform the action.

9. The apparatus of claim 8 wherein the secondary usage rights define control system content permissions for one or more user groups associated with the secondary entity.

10. The apparatus of claim 8 wherein the primary security authority and the secondary security authority are enforced at the industrial controller.

* * * * *